United States Patent Office 3,200,912
Patented Aug. 17, 1965

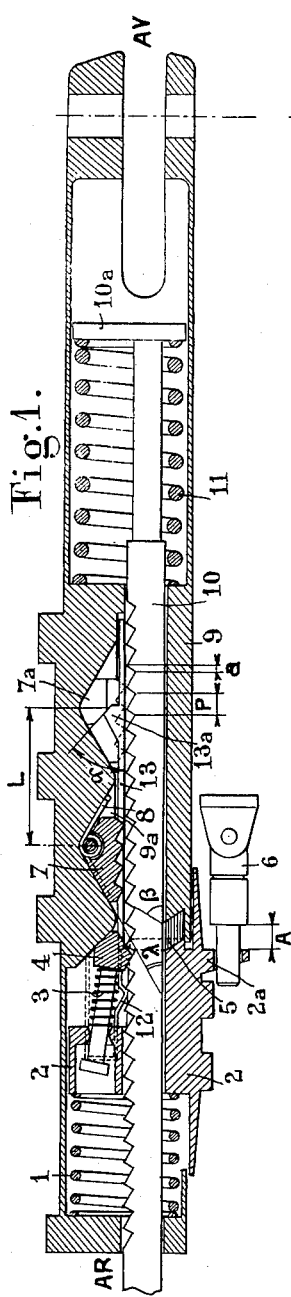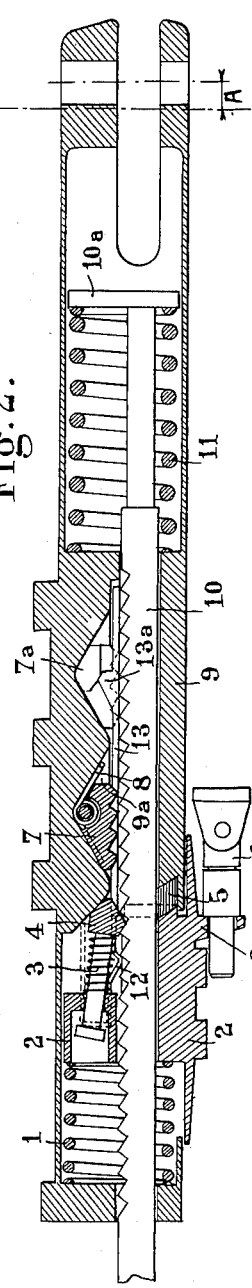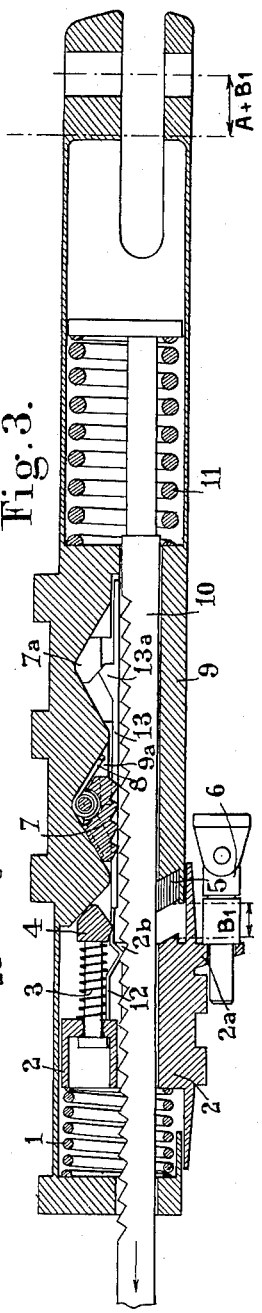

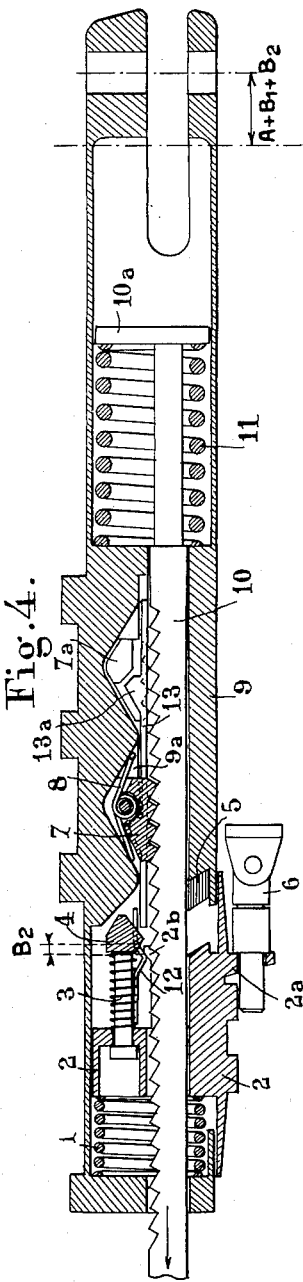
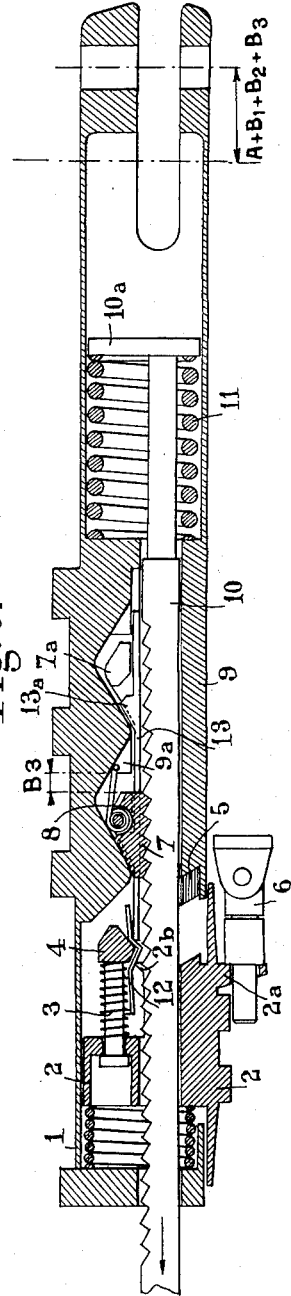
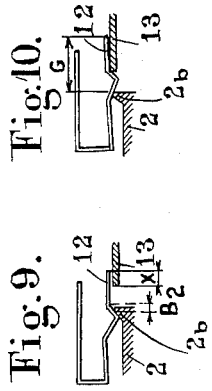
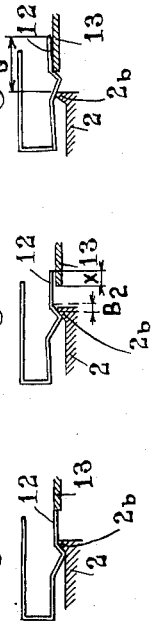
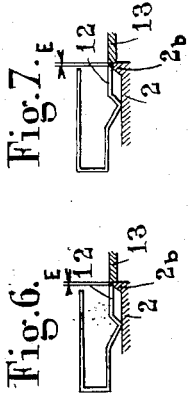

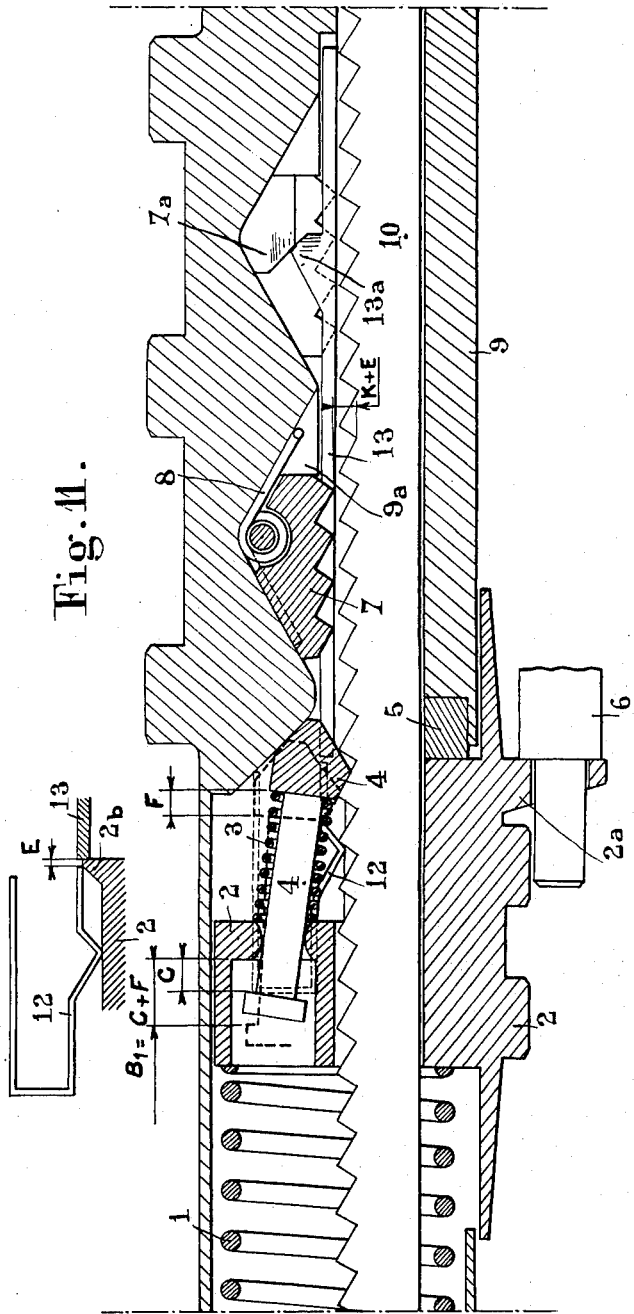

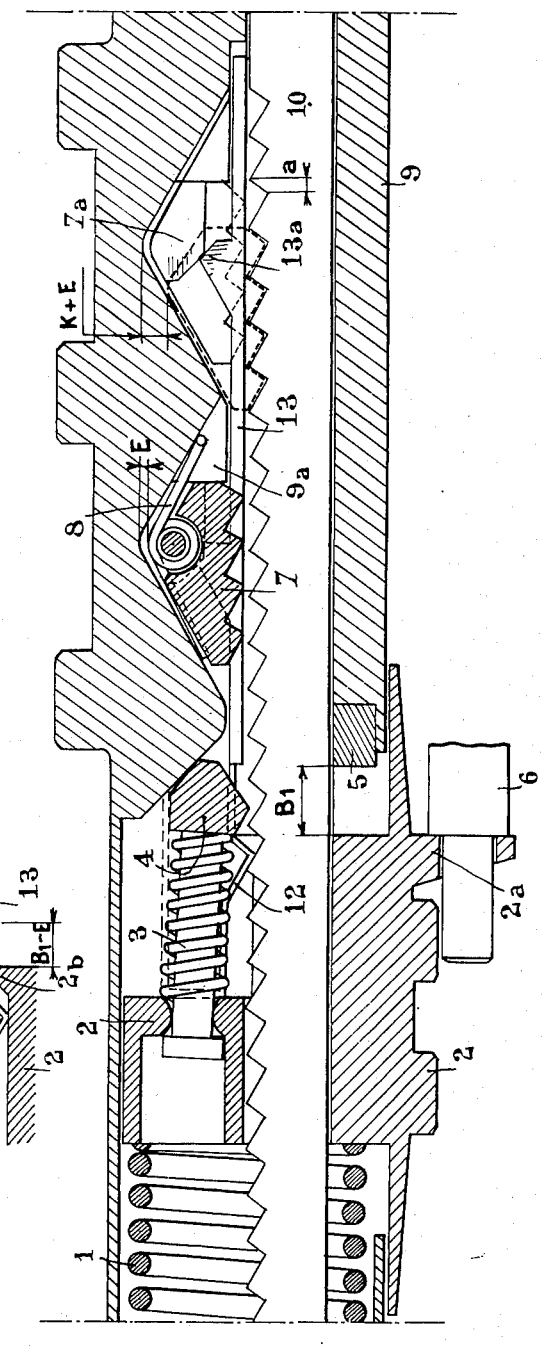

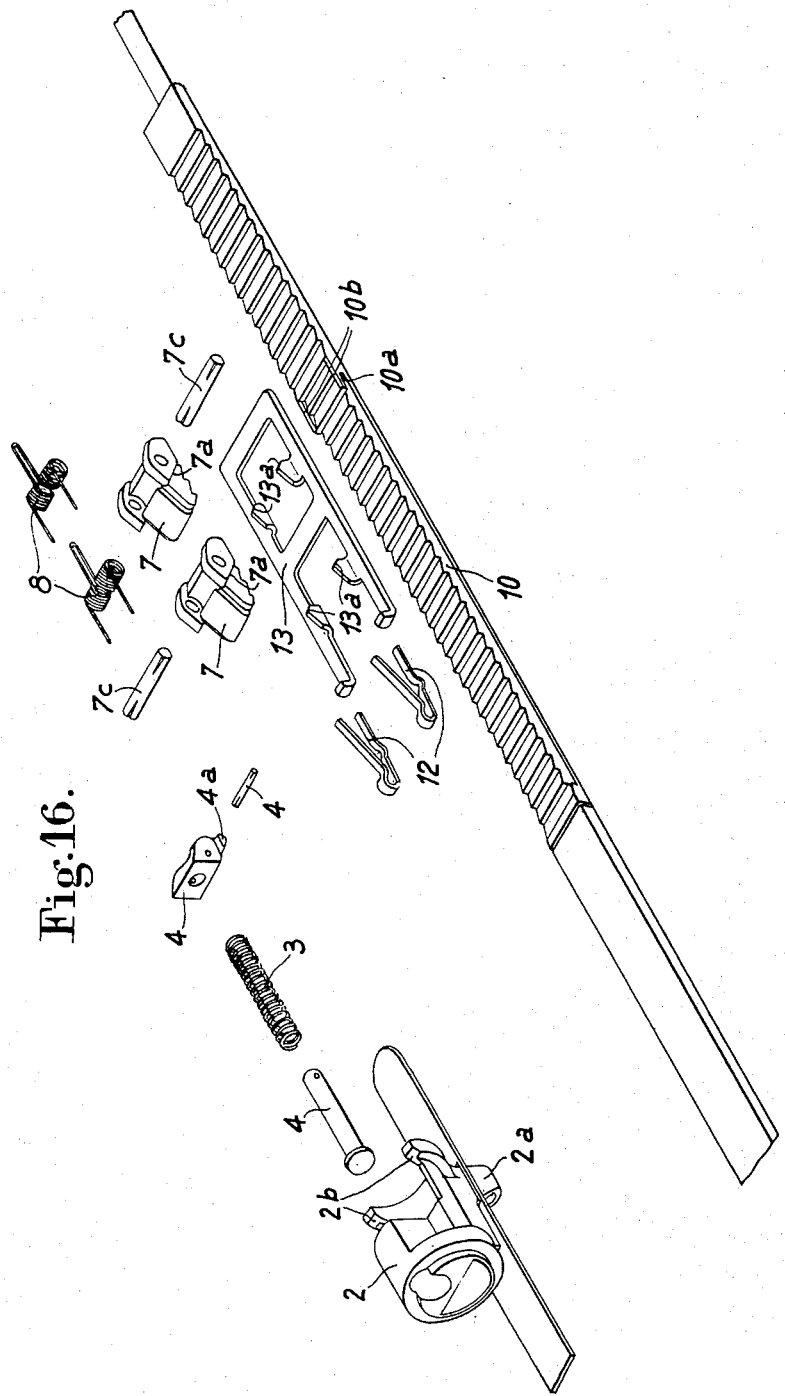

3,200,912
BRAKE ADJUSTER FOR RAILWAY VEHICLES
Jean-Baptiste Bouvat-Martin, Paris, France, assignor to Societe Generale "Isothermos" Societe Anonyme, Paris, France
Filed Dec. 18, 1963, Ser. No. 331,572
Claims priority, application France, Oct. 7, 1963, 949,778, Patent 1,378,988
7 Claims. (Cl. 188—196)

This invention relates in general to brake adjusting devices and has specific reference to a brake adjuster substituted for a link in a brake control linkage with a view more particularly to adjust the play or clearance at the shoes of brake linkage systems of railway vehicles.

In the form of embodiment to be described presently the device consists more specifically of an adjuster interposed as a substitute for a traction rod in a brake operating linkage of a railway power or hauled car, but the principle on which this device is based is easily applicable to other vehicles as well as to the case of a compression rod, provided that the shape of the component elements is adapted to the maximum braking effort required for the vehicle contemplated.

The function of this adjuster is to become elongated or shortened, or to expand or contract, during each brake application in order to keep to a constant value the length of the brake-shoe stroke which is necessary for such brake application, irrespective of the progressive or sudden variations in play which may develop as a consequence of brake-shoe wear or for instance of variations in the height of the car coach.

This brake adjuster comprises a body of elongated configuration having its front end attached to the traction power system, a rack or traction rod slidably mounted in said body and attached by its end projecting from the rear end of said body to the brake mechanism, one longitudinal face of said rack or traction rod having triangular-shaped teeth cut therein, each tooth having unequal faces with the major face directed forwards, one or more clamps housed in said body and formed with teeth corresponding in shape to those of said rack or traction rod, spring means urging said clamp or clamps to a position of meshing engagement of the clamp teeth with the rack teeth, and a trigger slidably mounted in the rear portion of said body and urged by a trigger spring reacting against the bottom of said body to a position of engagement with an intermediate ring slidably mounted behind a shoulder formed on said body. The function of said trigger, when it is moved backwards in relation to said body against the resistance of said trigger spring, consists in releasing a clamp release ram or push member while allowing the teeth of at least one of said clamps to mesh with the rod teeth, thus stiffening the adjuster in the traction direction.

The features and advantages characterizing this invention will become more apparent as the following description proceeds with reference to the accompanying drawings wherein FIGURES 1 to 5 inclusive illustrate diagrammatically by way of example longitudinal sections taken along the longitudinal mesial plane of the rack or traction rod of a device according to the invention, one of the clamps being removed to show the contours of the corresponding cam faces associated with the locking push-member or ram and of said clamp.

These FIGURES 1 to 5 inclusive illustrate five possible positions of the adjuster between successive operating steps, during a brake application, and show notably:

FIGURE 1, the adjuster in its inoperative position;

FIGURE 2, the position of the adjuster when, at the beginning of a brake application, the trigger engages the abutment controlling its backward shifting in relation to the body;

FIGURE 3, the position of the adjuster when the backward shifting of the trigger in relation to the body attains the maximum retaining position of the clamp release ram or push member;

FIGURE 4, the position of the adjuster subsequent to the release of said ram or push member and to the movement of said clamps urged by their springs toward the rack teeth;

FIGURE 5, the position of the adjuster when the teeth of a clamp mesh completely with those of the traction rack.

Furthermore,

FIGURES 6 to 10 inclusive corresponding to the five preceding figures respectively show in a different plane details of the mechanism for retaining the clamp release ram or push member;

FIGURES 11, 12, 13 and 14 illustrate fragmentary views similar to FIGURES 2, 7, 3 and 8 and on a larger scale various constructional details;

FIGURE 16 is an exploded view showing substantially on the same scale as FIGURES 1 to 5 the essential component elements mounted in the body.

Figure 15:
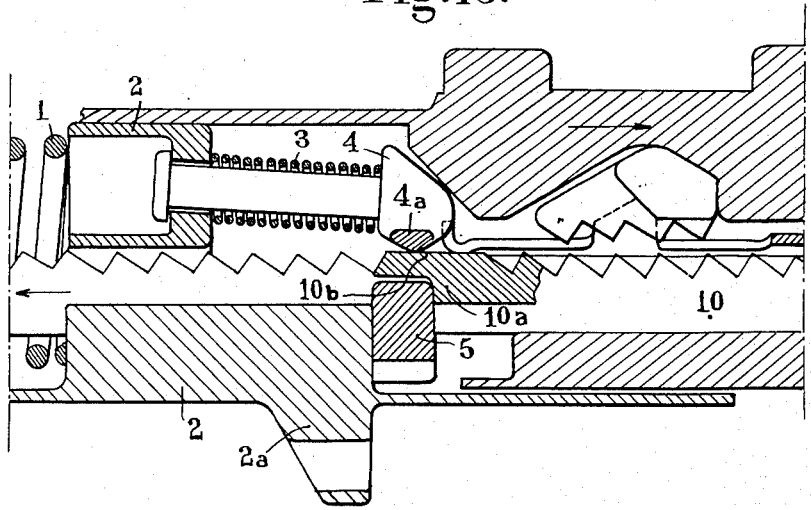
FIGURE 15 illustrates in a manner similar to FIGURE 11 another constructional detail.

The adjuster portion connected to the traction power system, as a rule a rocker, is a body 9 of elongated configuration. This body acts as a guide to a rack or toothed traction rod 10 and also as a bearing to clamps 7 (FIGURE 5) and to a released-brake wedge 4 (FIGURE 1). This body is dimensioned to transmit the highest braking efforts.

The rear end of the adjuster which is connected to the central linkage system consists of the rear portion of rack 10. The tractive efforts are transmitted from this rack 10 through one of the clamps 7 to the body 9. The rack 10 terminates at its forward end with a circular bearing flange 10a adapted in the inoperative position (FIGURE 1) to prestress a compression coil spring 11 against the body 9.

This spring 11 is so dimensioned as to carry along the complete linkage system as long as the brake shoes are not applied.

The rack or traction rod 10 carries on one face a set of teeth of a length sufficient to enable the clamps 7 to become engaged along any adjuster take-up stroke contemplated. The pitch $p$ of the rack teeth is calculated according to the desired degree of precision of the stroke of the traction power system and to the necessary tooth strength. Each tooth of length $p$ has a triangular section with unequal faces, the minor face inclined by an angle $\beta$ facing backwards and having a length $a$ when projected on the axis of rod 10. In addition, the inclination $\beta$ of this minor rear face of each tooth is proportioned to the inclination $\lambda$ of the rear faces of the clamp recesses in order to satisfy the inequality $$\beta - \lambda > 2\varphi$$

wherein $\varphi$ is the angle of frictional engagement between the metal faces of clamps 7 and the metal faces of the body 9 and rack 10. Thus, the clamps 7 are self-locking in that an effort tending to elongate or expand the adjuster in the position of FIGURE 5 urges said clamps in the direction of their full meshing engagement with the rack teeth.

A trigger 2 is slidably mounted in the rear portion of the body 9 and resiliently urged in the forward direction for engagement with an intermediate ring 5 adapted to bear against a shoulder of said body by a coil compression spring 1 reacting against the bottom of said body 9. This trigger 2 has an abutment-forming outer heel or like portion 2a adapted to engage a fixed external abutment member 6 rigid with the frame of the vehicle or the brake operating linkage. Moreover, this trigger is formed with two front ends 2b slightly raised on the side opposite to the teeth of the traction rod 10.

Each clamp 7 has a front face and a rear face both inclined and flat, and adapted to bear against the upper flat faces of its recess when the clamp is in its retracted position shown in FIGURE 1. Moreover, on either side of its two side faces bounding its lower toothed face this clamp carries two projecting flat portions 7a limited at the front by two flat small faces directed at right angles to the axis of the adjuster and adapted in the same retracted position of the clamp to bear against two corresponding small faces 9a cut in the side walls of the recess. These two lateral flat projecting portions 7a are limited at the rear by two inclined small faces directed forwards and downwards and forming an angle $\alpha$ with the axis of the adjuster, this angle $\alpha$ being 45° in the example illustrated. Extending through and across the upper portion of the clamp 7 is a pin 7c having mounted in its ends a V-shaped spring 8 bearing with its arms against the upper flat faces of said recess so as to urge the clamp 7 for engagement with the teeth of traction rod 10. A clamp-release push-member 13 comprises two lateral portions slidably mounted in the body 9 on either side of the toothed portion of traction rod 10 and provided with small faces 13a inclined downwards towards said traction rod and to the rear with the same inclination $\alpha$ as the aforesaid angle. These small faces 13a are adapted to engage the corresponding small faces, of same inclination, of said lateral projection portions 7a of clamps 7 in order to release these clamps 7 from the teeth of said traction rod 10 and keep them, against the resistance of their springs 8, in the retracted position in which they are shown in FIGURE 1, when the release push-member 13 is moved forwards and kept in this position, as shown in FIGURES 1, 2 or 11. In the body 9, and on either side of the toothed portion of traction rod 10, two elastic blades 12 are mounted of which the operative, forwardly directed ends adjacent to said traction rods are, in the inoperative position of the brake adjuster shown in FIGURES 1 and 2 (and as clearly shown in FIGURES 6 and 7), spaced from the rear ends of said push member 13 by a relatively small play or gap E. Moreover, these operative arms of the two elastic blades 12 have downwardly bent end portions or elbows 10. In the inoperative position of the adjuster, as shown in FIGURE 1, the spring 1 urges the trigger 2 for engagement with the ring 5 of the body, and its two control ends 2b urge the transmission ends of push member 13 to the position which, as a consequence of the action exerted by the cam faces 13a of this push member on the inclined small faces of the lateral projecting portions 7a of clamps 7, causes the small faces of these portions 7a which are perpendicular to the axis of the adjuster to engage the corresponding small faces of the inner lateral walls of the recesses, thus locking these clamps 7 in their retracted positions.

A lock pawl or wedge 4 urged by a coil compression spring 3 is also housed within the trigger 2 for stiffening the adjuster in the shortening direction when the trigger 2 bears against the intermediate ring 5 as shown in FIGURES 1, 2 and 11.

In case the adjuster has the desired length, during a brake application it operates as follows:

Before the brake application the adjuster is in the position shown in FIGURE 1 wherein the coil trigger spring 1 presses the trigger 2 against the body 9 through the medium of the intermediate ring 5. The push member 13 is moved forwards and causes the clamps or pawls 7 to recede in their recesses formed in the body 9. The wedge 4 is lowered until its head is wedged between the body 9 and one tooth of rack 10. Thus the length of the adjuster cannot be reduced by the force of spring 11 or as a consequence of a shock. A shock applied in the direction to elongate the adjuster can only cause the spring 11 to be compressed by a length $>p$, which is quite unlikely but without any detrimental consequence since the adjuster resumes its normal length at the first subsequent brake application. The abutment heel 2a of trigger 2 is spaced from the fixed abutment 6 by a gap of length A adjusted as a function of the characteristics of the vehicle to be braked.

When the body 9 is pulled forwards by a length A the adjuster is moved without altering the relative position of its component elements, until the brake shoes engage the wheels and, simultaneously, the abutment heel 2a of trigger 2 engages the fixed abutment 6, as shown in FIGURE 2.

During a complementary forward movement of amplitude $B_1$ of the body 9, as shown in FIGURES 3, 8 and 13, 14, the trigger 2 retained by the fixed abutment 6 is shifted backwards in relation to the body 9 by the same length $B_1$ while compressing the coil spring 1 and releasing the wedge 4. This release of wedge 4 takes place during two successive sections C and F of the aforesaid distance $B_1$, the respective amplitudes of these sections being illustrated in FIGURE 11. The first section C takes up the play existing in the shank of wedge 4 relative to its recess in the trigger 2, and the second section F enables the head of this wedge to be straightened by the coil spring 3 to the position shown in thick lines in FIGURES 3 and 13 and in dotted lines in FIGURE 11, in which position the wedge 4 is freed from the teeth of rack 10. During the next part of the description the formula (1) $$B_1 = C + F$$

corresponding to the above-described decomposition of the first relative movement of the trigger with respect to the body will be taken into account. The clamps 7 are still disengaged since the release push member 13 is retained by the action of spring blade 12 thus preventing any contact and wear of the teeth. The brake shoes are still in contact with the wheel tires.

During a complementary forward movement of amplitude $B_2$ of the body 9 and as shown in FIGURES 4 and 9, the end 2b of trigger 2 engages a cam face of the spring blade 12, and the latter is raised by the cam face 2b of trigger 2, thus releasing the sliding ram or push member 13. Under these conditions, the body 9 was moved from its inoperative position by a length $$A + B_1 + B_2$$

and the clamps 7 urged by their separate spring 8 engage the rack teeth while urging through their cam faces 7a the sliding ram or push member 13 backwards.

FIGS. 5 and 10 illustrate the beginning of the last phase of the operation of the device, during which the body 9 and the rack 10 are solid in translation with each other in the direction of the tractive effort as a consequence of the meshing engagement of one of the clamps 7 with the rack teeth. In this position the body 9 was moved forward by the additional distance $B_3$ necessary to enable one of said two clamps 7 to be fully engaged with the rack teeth while bearing against the body 9. Thus the body 9 was moved from its inoperative position (FIGURE 1) by a length $$A + B_1 + B_2 + B_3$$

Continuing the traction on this body 9 through the brake-actuating power system will then produce the brake application by the actual engagement of the brake shoes with the wheels, the tractive effort being transmitted to the rack or traction rod 10 through the medium of the cam face formed by the rear wall of the recess receiving the clamp concerned, i.e. the rear clamp in the case illustrated in the drawings, and, of course, through this clamp and the rack teeth engaged thereby. It should be noted that the stroke A corresponding to the engagement of the wheels by the brake shoes is a characteristic of the vehicle, while the strokes $B_1$, $B_2$ and $B_3$ are constant constructional characteristics of the adjuster.

When the adjuster has no more the desired length, the requisite length is restored at the first subsequent brake application through the operation described hereinafter.

If the adjuster is too short, the brake shoes engage the wheels before the abutment $2a$ engages the fixed abutment member $6$. Under these conditions, the adjuster can expand due to the possibility for the wedge $4$ to recede resiliently until the trigger $2$ engages the fixed abutment member $6$. Then the normal-play conditions of the preceding case (FIGURE 2) are restored.

If the adjuster is too long the trigger $2$ strikes the abutment member $6$ before the brake shoes engage the wheels. The procedure is the same as in the case of normal plays, until the conditions of FIGURE 3 are attained, wherein the wedge $4$ is raised. In this position and under the influence of coil spring $11$ the rack $10$ moves forward and carries along the operating linkage until the brake shoes engage the wheels. Thus, the normal-play conditions of the preceding case are again restored, the consequence of the locking action being the same. It is thus clear that in all cases the piston stroke is restored to a normal value during the first brake application corresponding to a stroke $$A + B_1 + B_2 + B_3$$

of the body $9$.

When the brakes are released and after the elastic elongation of the brake operating linkage has been re-absorbed, the body $9$ is moved backwards of the power system by the springs $1$ and $11$. After a movement $B_3$ the shoulder $9a$ of the locked body $9$ engages the clamp $7$ (FIGURE 4). After a stroke $B_2 + B_3 + F$ the wedge $4$ is locked again in the position shown in FIGURE 2. After a stroke $B_1 + B_2 + B_3$ and by virtue of the play $E$, the end of the spring blade $12$ is reset in front of the sliding push member $13$ retained by the heel $2b$ of trigger $2$. Then the adjuster is in its inoperative position (FIGURE 1) and ready for another brake application with an additional stroke $A$, which makes $A + B_1 + B_2 + B_3$ on the whole.

This adjuster construction ensures a complete locking safety even in case of accidental failure of the locking member $6$.

In fact, as shown in FIGURE 15, the rack $10$ is formed with two lateral shoulders $10a$ which, when a predetermined expansion of the adjuster takes place, carries along the ring $5$ by which the trigger $2$ is then moved towards the rear end of the adjuster until it is locked as a consequence of the above-described sequence of operations.

The position of shoulder $10a$ on rack $10$ is such that the two clamps $7$ drop into the rack teeth when the trigger $2$ releases the normal locking system of the adjuster. It is also necesary that, as in the type of operation described hereinabove, the adjuster may be reset automatically upon releasing the brakes. To this end, two cam faces $10b$ on the two lateral shoulders $10a$ are adapted to engage two lateral swells $4a$ on wedge $4$ to prevent the latter from locking the body $9$ in relation to the rack $10$ before the spring blade $12$ is reset in front of the sliding ram or push member $13$.

It would not constitute a departure from the basic principles of the invention to bring various modifications in the above-described construction. Thus, notably, the angle of cam faces $13a$ and $7a$ may differ slightly from $45°$ without interfering with the proper operation of the device.

Moreover, the relative values of $B_1$ and $B_2$ may vary to a certain extent. Thus, the following cases may be contemplated:

(a) $B_2 = 0$. Under these conditions, the wedge $4$ and spring blade $12$ are released simultaneously;

(b) $B_2 < 0$. Under these conditions, the spring blade $12$ is raised before the wedge $4$ is released. In this case, during the brake release the wedge $4$ is re-locked between members $9$ and $10$ as the body $9$ moves through a distance $B_3 + F$.

In the example described and illustrated herein the adjuster comprises two clamps having their recesses shifted in relation to each other in the body $9$ by a whole number of pitches plus a half-pitch. If on the other hand the adjuster, instead of comprising only two clamps has any number $n$ of such clamps, the successive recesses therefor in the body $9$ are spaced by intervals:

$$\left(N + \frac{1}{n}\right)p$$

wherein N designates an integer and $p$ the pitch.

In this general case the precision of the resulting adjustment is $p/n$.

The number $n$ is selected with a view to combine a relative great strength (due to a large pitch $p$) with a sufficient precision $p/n$.

The invention further comprises dimensional requirements whereby a reliable locking action is ensured in all cases with the full engagement of the clamp teeth in the rack teeth, which dimensional requirements are set forth hereinafter.

Whenever permitted by the configuration of the adjuster, the possibility that one of the clamps $7$ bears simultaneously on one portion of the rack teeth and on the cam face $13a$ of the ram or sliding push member $13$ (the latter contacting the trigger $2$) should be precluded, for in this case the tractive effort would most probably be transmitted through the tips of the teeth and the latter would be damaged very rapidly. To this end, the various component elements are so dimensioned that the sliding push member $13$ may always perform in relation to the trigger $2$ a movement corresponding to the complete engagement of one of the clamps $7$, that is:

$$\frac{K}{tg\alpha} + a$$

or, in the form of embodiment illustrated in the drawings: $K + a$ if $\alpha = 45°$).

Now two critical cases should be contemplated:

(1) A brake application from the set position with the brake released.

It may happen that during normal service conditions the brake application does not take place fully at once, but occurs in the form of successive incomplete alternate applications and releases. This leads to the consideration of the case in which (2) A brake application follows a partial brake release.

Considering the case of a brake application from the position obtaining when the brake is released and at the time the sliding ram or push member $13$ is released as a consequence of the upward movement of spring blade $12$ (FIGURE 4), the distance $G$ available between the tip of this blade $12$ and the abutment face of the heel $2b$ of trigger $2$ is $$G = B_1 \pm B_2 - E \geq K + a$$

wherein the double sign before the absolute value $B_2$ corresponds respectively to the case in which, as in the drawings, the ram or sliding push member $13$ is released after the wedge $4$ and to the case in which this sequence were reversed.

Considering the Formula 1 mentioned hereinabove this requirement becomes $$C + F \pm B_2 - E \geq K + a$$

(2) $$\boxed{C \geq K + a + E - F \mp B_2}$$

In the case of a brake application following a partial release and if the release exceeds $B_3$ from the position shown in FIGURE 5, thus restoring these component elements to the position illustrated in FIGURE 4, the clamps $7$ may be moved backwards by the shoulder $9a$ and cause the sliding push member $13$ to recede when dropping into the next tooth.

The overlap X between the sliding push member $13$ and the spring blade 12, which is shown in FIGURE 9, will vary periodically between the values 0 and $K+a$.

In order constantly to meet the requirement $G \geq X$ it is necessary that $G \geq K+a$. During this phase of the movement the value of G is in the first type of construction, as illustrated in the drawings, and in the second type of construction as defined hereinabove $G=B_1-E$.

For an additional stroke $B_2+F$ or F, the wedge 4 is re-locked between the body 9 and the rack at 10, while discontinuing any relative movement of clamps 7, body 9, rack 10, spring blade 12 and ram 13.

When the wedge 4 is locked the value G becomes respectively, in the two types of construction:

$$B_1+B_2-E-(F+B_2)$$
$$B_1-E-F$$

or, in one or the other case:

$$G=B_1-E-F$$

and, considering the above Formula 1, the requirement becomes $$C+F-E-F \geq K+a$$

or, otherwise stated:

(3) $\boxed{C \geq K+a+E}$

In the type of construction shown in the drawings the requirement corresponding to the second operating phase is more restrictive and finally it is this inequality (3) that must be adopted as a basis for the construction.

In the other type of construction mentioned hereinabove the more restrictive one of the two conditions (2) and (3) must be taken; thus, more particularly, if one takes $B_2=F$, the requirement remains the same (inequality (3)) as in the first type of construction. Should α depart from 45°

$$\frac{K}{tg\alpha}$$

should be substituted for K in the above inequality (3).

From the foregoing it will be seen that the construction according to the present invention is characterized mainly by the following advantages and features:

(a) The use of a rack 10 and clamps 7 having very reduced radial dimensions, whereby a body having a substantially cylindrical configuration and a reduced diameter may be used;

(b) The use of a trigger co-operating with a sliding push member 13 and a spring blade 12 positively prevents the clamps 7 from jamming with the tips of the rack teeth when applying the brakes completely;

(c) The clamps 7 are definitely prevented from becoming locked on the tips of the rack teeth when alternate incomplete brake applications and releases are performed, due to the reaction of a wedge 4 and of a spring blade 12 permitting the driving engagement between the rack 10 and body 9 only at such times when the contact with the tips of the teeth is not possible;

(d) The use of self-locking clamps subjected to transverse compressive efforts, which ensures a completely reliable taking up of plays and wearing clearances between the meshing sets of teeth while eliminating any plays and wearing clearances characterizing hitherto conventional pivotal mountings;

(e) The adjuster is locked at the end of its complete expansion by automatically releasing the trigger 2 in case of failure of the control abutment member 6, thus avoiding the maximum compression of the spring urging the rack in the body in the direction to reduce the length of the adjuster.

What I claim is:

1. A brake adjuster to be mounted between a traction power system and a braking system, which comprises a body having a front end coupled to said traction power system and a rear end formed with a bottom, a traction rod slidably mounted in said body and having a forward end formed with a circular bearing flange, a rear end extending through the bottom of said body and coupled to said braking system, and an intermediate portion having an upper face in which teeth are cut, a trigger slidably mounted on and surrounding the rear portion of said body, said trigger having two control ends disposed on either side of said tooth portion of said traction rod, said ends being directed forwards and bent upwards, said body having a stop ring disposed forward of said trigger, a first spring housed in the rear portion of said body and adapted to bear against said bottom for urging said trigger forwards to a position of engagement with said stop ring, means carried by said trigger and co-acting with said body and said teeth on said traction rod for counteracting the forward slipping movement of said rod in said body when said trigger engages said stop ring in said body and permitting said forward slipping movement of said rod in said body when said trigger is shifted to a certain extent towards the rear of said stop ring in said body against the resistance of said first spring, a second spring housed behind said circular flange and bearing against said body to urge said traction rod forwards with respect to said body, said body having formed therein above the teeth of said traction rod at least one recess comprising an upper wall overlying said teeth and consisting of two inclined faces, and, on either side of said teeth, two lateral walls comprising each a flat small face perpendicular to the axis of the adjuster, a clamp located in said recess, formed with two upper inclined faces adapted to bear flat against said inclined faces of said upper wall of said recess, a lower face formed with teeth adapted to mesh with the teeth of said traction rod and two lateral faces each provided with a flat projecting portion bounded on the one hand by a flat small face perpendicular to the axis of the adjuster and adapted to bear flat against said small face of one of said lateral walls of said recess when said two upper inclined faces of said clamp engage said inclined faces of said upper wall of said recess, and on the other hand by another flat small face inclined forwards and downwards at an angle of about 45° to said axis, a pin extending through the upper portion of said clamp, a V-shaped spring mounted on the ends of said pin and bearing with its two arms against said inclined faces of said upper inclined wall of said recess to urge said clamp out from said recess to a position of meshing engagement between its lower toothed face and said upper toothed face of said traction rod, a push member having two portions slidably mounted in said body on either side of the teeth of said upper face of said traction rod, said two portions having each their rear ends shaped to constitute transmission ends, being formed with a flat small inclined face parallel to said flat small inclined faces of said lateral projecting portions of said clamp, and being further adapted to bear against one of said inclined small faces when said transmission ends of said push member are subjected to a forward stress to cause said clamp to slide and rise up said small faces, perpendicular to the axis of the adjuster, of said lateral projecting portions of said clamp, against the small faces perpendicular to said axis of said lateral walls of said clamp-receiving recess, to a retracted position of said clamp wherein said upper inclined faces of said clamp engage the inclined faces of the upper wall of said recess, the control ends of said trigger engaging themselves up the transmission ends of said push member when said trigger is urged by said first spring against said stop ring of said body to hold said clamp in its retracted position, a pair of elastic blades mounted in said body on either side of said teeth formed in the upper face of said traction rod and having each a retaining end directed forwards towards said transmission end of one of said portions of said push member and spaced from said last-named end by a small play E when said trigger, urged by said first spring to its position of engagement with the stop ring of said body, holds with its control ends said clamp in its retracted position, said retaining ends of said elastic blades being adapted to retain the transmission ends of said push member when said trigger and its control ends have been shifted backwards of said body from their position of engagement with said stop ring of said body against said first spring by said play E, said elastic blades being formed at a certain distance from their retaining ends and backwards thereto with release elbows extending downwards and engageable by said bent control ends of said trigger to raise the retaining ends of said elastic blade and thus release the transmission ends of said push member while enabling said clamp spring to urge said clamp downwards, outside said recess, until said clamp engages with its toothed lower face said toothed upper face of said traction rod when said trigger and its control ends have been shifted backwards from its position of engagement with said stop ring of said body and against the action of said first spring by a length equal to the sum of said play E and the relative spacing of said release elbows of said blades backwards of the retaining ends of said blades.

2. A brake adjuster as set forth in claim 1, wherein said teeth formed on the lower face of said clamps and on the upper face of said traction rod are triangular teeth, the inclination $\beta$ to the adjuster axis of the rear faces of the teeth of said traction rod being greater than the inclination $\lambda$ to the adjuster axis of said backwardly inclined face of the upper wall of said clamp-receiving recess in said body, said two inclinations being related to the friction angle $\varphi$ of the clamp metal on the metal of said rod and said body by the relationship $\beta - \lambda > 2\varphi$, whereby, in the case of complete release of the transmission ends of said push member with respect to the control ends of said trigger, an effort exerted on said traction rods towards the rear end of said body will cause a complete meshing engagement of said teeth formed on the lower face of said clamp with the teeth formed on the upper face of said traction rod.

3. A brake adjuster as set forth in claim 1, wherein said means carried by said trigger which cooperate with said body and said teeth on the upper face of said traction rod to counteract the forward sliding movement of said traction rod in said body as long as the shift of said trigger backwards of its position of engagement with said stop ring against the action of said first spring remains inferior to a predetermined length, consist of a pin having at the rear a shank slidably retained in said trigger and a forwardly directed head, said body being formed with a shoulder registering with said pin head, and a third spring reacting on said trigger and urging said head to a locking position in which said head is wedged between said shoulder of said body and a hollow between two teeth of said upper face of said traction rod when the shift of said trigger backwards of said stop ring is inferior to the aforesaid length, and lifting said head above said teeth of said upper face of said traction rod when the shift of said trigger backwards of said stop ring exceeds said length.

4. An adjuster as set forth in claim 1, wherein said traction rod is formed with a shoulder adapted, during the backward sliding movement of said traction rod in said body, to engage said trigger to shift same backwards in said body against the resistance of said trigger spring.

5. An adjuster as set forth in claim 3, wherein said predetermined value of backward shifting of said trigger in relation to said body which permits the sliding movement of said traction rod in said body in the direction to shorten said adjuster is the sum of a term G corresponding to a first travel section during which said trigger takes up the play of said pawl shank, and of another term F corresponding to a second travel section during which said trigger acts upon said pawl shank to pull same backwards to the extent necessary for releasing the head of said pawl while the third spring raises this head above the teeth of the upper face of said traction rod.

6. A brake adjuster as set forth in claim 5, wherein the rear face of each tooth formed on the upper face of said traction rod and projected onto the axis of the adjuster has a length $a$ and the component perpendicular to said axis of the clamp movement which, from the position corresponding to the shift E of said trigger backwards of said stop ring, ensures the complete meshing engagement of the teeth formed on the lower face of said clamp with the teeth formed on the upper face of said traction rod, is equal to K, the sum of said play E and of the distance of the elbows of said elastic blades backwards of the retaining ends of said blades being greater by F than the backward shift of said trigger with respect to said stop ring which permits the sliding movement of said traction rod in said body in the direction to reduce the length of the adjuster, and wherein any locking of said teeth formed on the lower face of said clamp with the teeth formed on the upper face of said traction rod is obtained through the complete meshing engagement of said teeth by the condition $$C \geq \frac{K}{tg\alpha} + a + E$$

7. A brake adjuster as set forth in claim 5, wherein the rear face of each tooth formed on the upper face of said traction rod has in projection onto the axis of the adjuster a length $a$ and the component perpendicular to said axis of the movement of said clamp from the position corresponding to the shift E of said trigger backwards of said stop ring ensures the complete meshing engagement of said teeth formed on the lower face of said clamp with those formed on the upper face of said traction rod is equal to K, the sum of the play E and of the distance of said elbows of said elastic blades backwards of the retaining ends of said blades being lower than the backward shift of said trigger with respect to said stop ring which permits the sliding movement of said traction rod in said body in the direction to reduce the length of the adjuster and wherein any relative locking engagement of the teeth formed on the lower face of said clamp with the teeth formed on the upper face of said traction rod is ensured with a complete meshing engagement of said teeth by the condition $$C \geq \frac{K}{tg\alpha} + a + E$$

References Cited by the Examiner

UNITED STATES PATENTS 3,001,612    9/61    Mersereau    188—196
3,119,470    1/64    Rauglas    188—196

ARTHUR L. LA POINT, *Primary Examiner.*

DUANE A. REGER, *Examiner.*